(12) United States Patent
Chandra et al.

(10) Patent No.: US 10,015,074 B1
(45) Date of Patent: Jul. 3, 2018

(54) ABSTRACT STACK PORTS TO ENABLE PLATFORM-INDEPENDENT STACKING

(71) Applicant: Cisco Technology, Inc., San Jose, CA (US)

(72) Inventors: Amit Chandra, Dublin, CA (US); Suresh Sangiah, Fremont, CA (US); Elangovan Kembanur Natarajan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 15/288,446

(22) Filed: Oct. 7, 2016

Related U.S. Application Data (60) Provisional application No. 62/259,432, filed on Nov. 24, 2015.

(51) Int. Cl.
*H04L 12/28* (2006.01)
*H04L 12/751* (2013.01)
*H04L 12/775* (2013.01)
*H04L 12/715* (2013.01)

(52) U.S. Cl.
CPC ............ *H04L 45/02* (2013.01); *H04L 45/583* (2013.01); *H04L 45/64* (2013.01)

(58) Field of Classification Search
CPC ........ H04L 45/02; H04L 45/64; H04L 45/583
See application file for complete search history.

(56) References Cited

U.S. PATENT DOCUMENTS

| 9,893,987 | B2 * | 2/2018 | Kamble | H04L 45/583 |
| 2007/0283015 | A1 * | 12/2007 | Jackson | H04L 45/02 |
| | | | | 709/226 |
| 2008/0148379 | A1 * | 6/2008 | Xu | H04L 29/125 |
| | | | | 726/11 |

* cited by examiner

*Primary Examiner* — Afshawn M Towfighi
(74) *Attorney, Agent, or Firm* — Parker Ibrahim & Berg LLP; James M. Behmke; Stephen D. LeBarron (57) ABSTRACT

In one embodiment, a stack manager of an operating system on a network device configures an egress abstract stack port and an ingress abstract stack port, where the configuring maps one or more physical ports of the network device to a corresponding abstract stack port. The stack manager then transmits platform-independent egress stack discovery messages on the egress abstract port to a remote ingress abstract stack port of an adjacent stack member, and receives platform-independent ingress stack discovery messages on the ingress abstract port from a remote egress abstract stack port of an adjacent stack member. The stack manager may then provide platform-independent stacked network device operation using connectivity between the egress abstract stack port and remote ingress abstract stack port, and connectivity between the remote egress abstract stack port and ingress abstract stack port.

20 Claims, 9 Drawing Sheets

FIG. 7 an example simplified procedure for providing for abstract stack ports to enable platform-independent stacking.

ABSTRACT STACK PORTS TO ENABLE PLATFORM-INDEPENDENT STACKING

RELATED APPLICATION

The present application claims priority to U.S. Provisional Application No. 62/259,432, filed on Nov. 24, 2015, entitled ABSTRACT STACK PORTS TO ENABLE PLATFORM-INDEPENDENT STACKING, by Chandra, et al., the contents of which are incorporated herein by reference.

TECHNICAL FIELD

The present disclosure relates generally to computer network operating systems, and, more particularly, to abstract stack ports to enable platform-independent stacking.

BACKGROUND

An operating system (OS) is system software that manages computer hardware and software resources, and provides common services for computer programs. General operating systems perform basic tasks, such as recognizing input from the keyboard, sending output to the display screen, keeping track of files and directories on the disk, and controlling peripheral devices such as disk drives and printers.

A computer network operating system, specifically, is a specialized operating system for a network device such as a router, switch, firewall, and so on. For instance, the Internetwork Operating System (IOS) available from Cisco Systems, Inc. is an example computer network operating system, where the IOS software used on routers and switches provides a package of routing, switching, internetworking, and telecommunications functions integrated into a multitasking operating system. For example, a computer network operating system can provide IP routing (basic, IPv4, IPv6, etc.) for data, voice, video, etc., and can provide security services and virtual private network (VPN) services as well as a myriad of other features, such as tunneling protocols, path reservation protocols, connectivity verification protocols, and so on. Generally, computer network operating systems function on various classes of network platforms. Such platforms include routers, switches (e.g., ATM switches, LAN and WAN switches, etc.), file servers, intelligent hubs, personal computers, and any other devices that function within an internetwork.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a stack manager of an operating system on a network device configures an egress abstract stack port and an ingress abstract stack port, where the configuring maps one or more physical ports of the network device to a corresponding abstract stack port. The stack manager then transmits platform-independent egress stack discovery messages on the egress abstract port to a remote ingress abstract stack port of an adjacent stack member, and receives platform-independent ingress stack discovery messages on the ingress abstract port from a remote egress abstract stack port of an adjacent stack member. The stack manager may then provide platform-independent stacked network device operation using connectivity between the egress abstract stack port and remote ingress abstract stack port, and connectivity between the remote egress abstract stack port and ingress abstract stack port.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
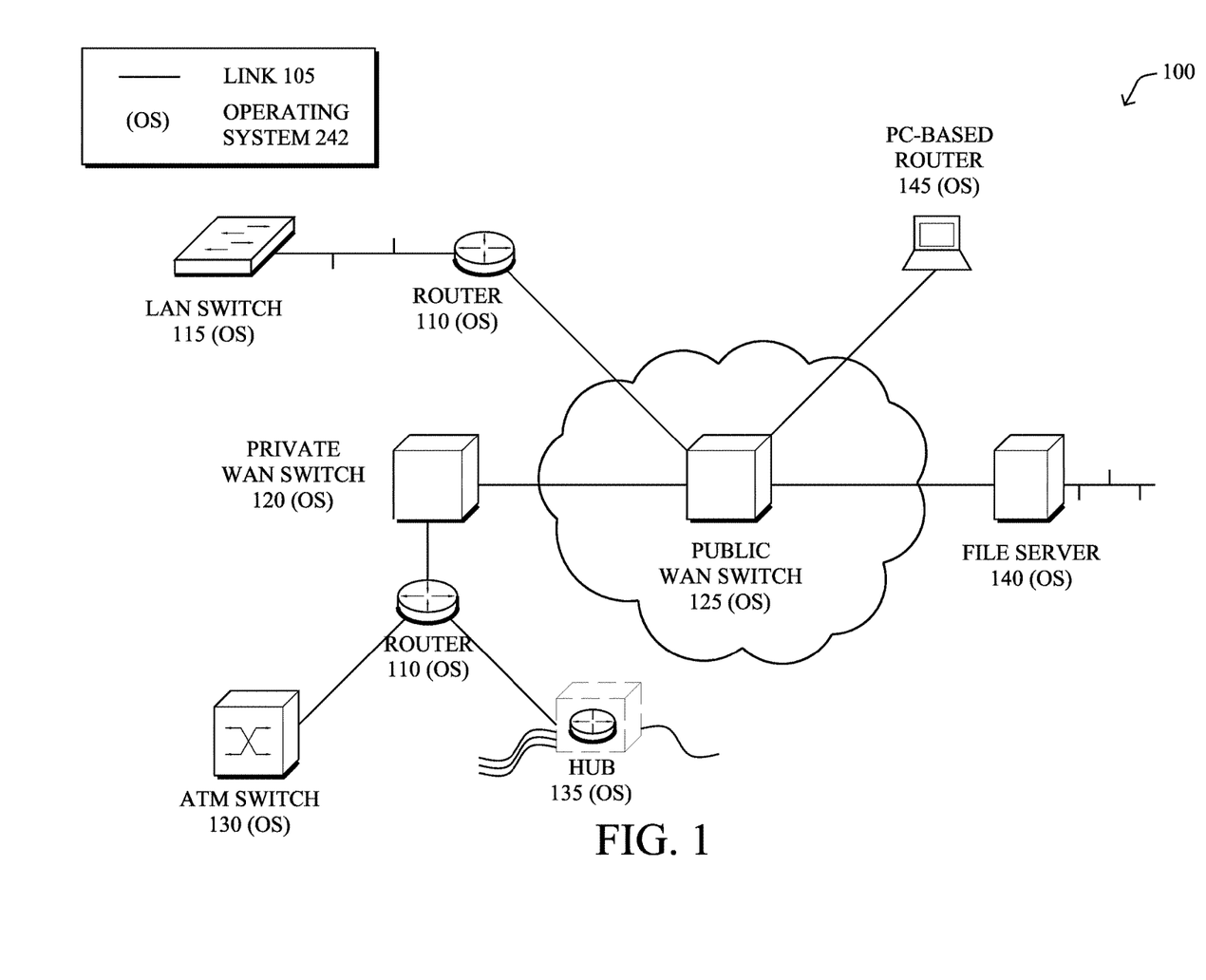
FIG. 1 illustrates an example communication network.

FIG. 1 is a schematic block diagram of an example computer network 100 illustratively comprising nodes/devices, such as a plurality of routers, switches, and so on interconnected by links 105 or networks, as shown. For instance, such devices may illustratively comprise routers 110, LAN switches 115, private WAN switches 120, public WAN switches 125, ATM switches 130, hubs 135, file servers 140, PC-based routers 145, etc. Notably, each device may have an operating system (OS) 242, as described below.

Data packets (e.g., traffic/messages) may be exchanged among the nodes/devices of the computer network over links 105 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. The links themselves may be wired links, wireless links, powerline communication links, and so on. Those skilled in the art will understand that any number of nodes, devices, links, etc. may be used in a computer network, and that the view shown herein is for simplicity.

Figure 2:
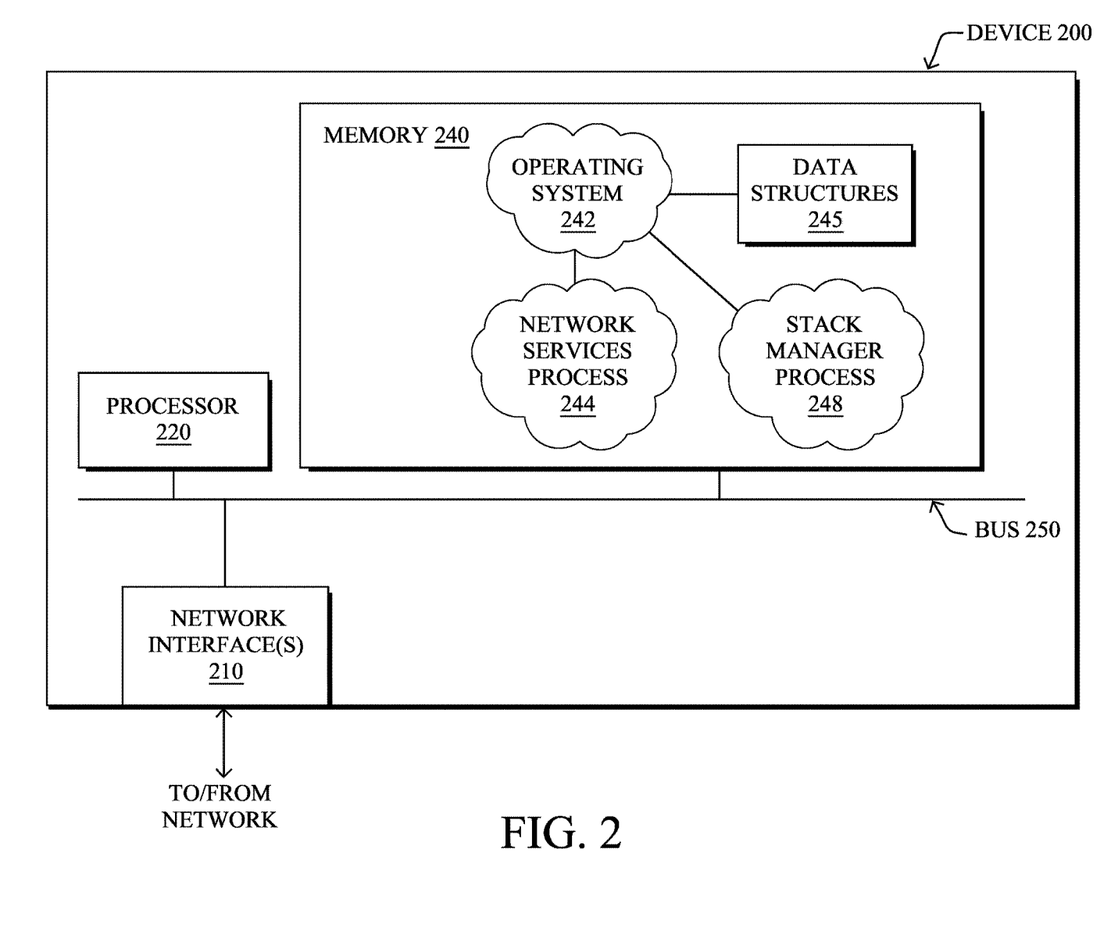
FIG. 2 illustrates an example network device.

FIG. 2 is a schematic block diagram of an example node/device 200 that may be used with one or more embodiments described herein, e.g., as any of the devices of network 100, or any other computing device that may perform the operating system techniques described herein (e.g., routers, switches, etc.). Device 200 comprises a one or more network interfaces 210, one or more processors 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols. Note that the nodes may have multiple types of network connections 210, e.g., wireless and wired/physical connections, and that the view herein is merely for illustration.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the device by, among other things, invoking operations in support of software processes and/or services executing on the device. These software processes and/or services may include one or more network service processes 244, such as routing processes, switching processes, traffic engineering processes, security processes, and so on, any of which optionally being alternatively be located within individual network interfaces. A stack manager process 248 may also be present on the device 200, the functionality of which being detailed further below.

Note that while dynamic processes are shown in centralized memory 240, alternative embodiments provide for the process to be specifically operated within the operating system 242, or within network interfaces 210. It will also be apparent to those skilled in the art that other processor and memory types, including various computer-readable media, may be used to store and execute program instructions pertaining to the techniques described herein. Further, while the description illustrates various processes, it is expressly contemplated that various processes may be embodied as modules configured to operate in accordance with the techniques herein (e.g., according to the functionality of a similar process). Moreover, while the processes have been shown separately, those skilled in the art will appreciate that processes may be routines or modules within other processes.

As an illustrative example of a network service process 244, a routing process may include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Other types of functional processes may be used by the device 200, and a routing process is merely one example that is not meant to be limiting to the embodiments herein.

—Abstract Stack Ports to Enable Platform-Independent Stacking—

Generally, customers can start building their network by purchasing a single network router/switch platform, and then can expand their network infrastructure as the need grows. However, the customers are limited by the given platform's ability to support redundancy and localized forwarding domains (across two routers/switches). Typically, such a requirement is handled by deploying larger modular or chassis based systems which included a redundant route or switch processor and multiple forwarding cards and adapters.

Stacking of routing and switching platforms allows expansion of forwarding domains, and redundant hardware deployment for a given network configuration without the need for developing larger modular or chassis based systems. Therefore, if stacking is available in the given platform then the customer can connect these platforms to expand localized forwarding domains and add hardware redundancy to their deployment.

Currently, however, supporting stacking in a platform traditionally requires the development of specialized stack interfaces and stack forwarding infrastructure, and only a limited number of switching platforms currently support stacking.

The techniques herein, therefore, are directed to an operating system infrastructure that provides stacking as service for any router or switch choosing to enable this feature. The "platform-independent stacking" techniques described herein provide a well-defined messaging interface for platform integration, and enable 1:1 control plane redundancy with additional stack members, which can change their role to standby or active, if needed. In addition, the techniques herein expand (using OIR—online insertion and removal) forwarding domains by treating each stack participant as member and their set of interfaces in the common forwarding domain. Moreover, the techniques herein may be used to provide a management interface to show stack topology and require a minimal stack configuration for a given platform, further allowing for auto-upgrading of software for a given member joining the stack, and enforcing licensing across the stack.

As also described below, the techniques herein provide a uniform stacking protocol and OS infrastructure which can be used in any routing or switching platform for enabling stacking. The platform can also provide a "thin" driver layer for ports classified as stack ports—which may or may not be dedicated stack interface ports. The stack ports can also be normal forwarding ports which can operate in a "Bundled" mode. Moreover, the stacking OS infrastructure provides a common communication interface such that the stacking infrastructure itself is not modified for a given platform, requires minimal configuration for deployment, and provides detailed stack topology states and statistics in the operating system command line interface (CLI).

Specifically, according to embodiments herein as described in more detail below, a stack manager of an operating system on a network device configures an egress abstract stack port and an ingress abstract stack port, where the configuring maps one or more physical ports of the network device to a corresponding abstract stack port. The stack manager then transmits platform-independent egress stack discovery messages on the egress abstract stack port to a remote ingress abstract stack port of an adjacent stack member, and receives platform-independent ingress stack discovery messages on the ingress abstract port from a remote egress abstract stack port of an adjacent stack member. The stack manager may then provide platform-independent stacked network device operation using connectivity between the egress abstract stack port and remote ingress abstract stack port, and connectivity between the remote egress abstract stack port and ingress abstract stack port.

Illustratively, the techniques described herein may be performed by hardware, software, and/or firmware, such as by the stack manager process 248 within and/or through coordination with the operating system 242, which may contain computer executable instructions executed by the processor 220 to perform functions relating to the techniques described herein. Note that while reference is made to functionality within the operating system 242, portions of the techniques described herein may be performed by any combination of various processes, and it is also expressly contemplated that various processes may be embodied as modules configured to operate in accordance with the techniques herein (e.g., according to the functionality of a similar process).

Operationally, the concept of an "abstract stack port" is introduced herein for operating systems, along with a platform-independent stack manager. The introduction of the abstract stack ports allows platforms to choose any port or port bundles as an abstract stack port, as described below.

Figure 3A:
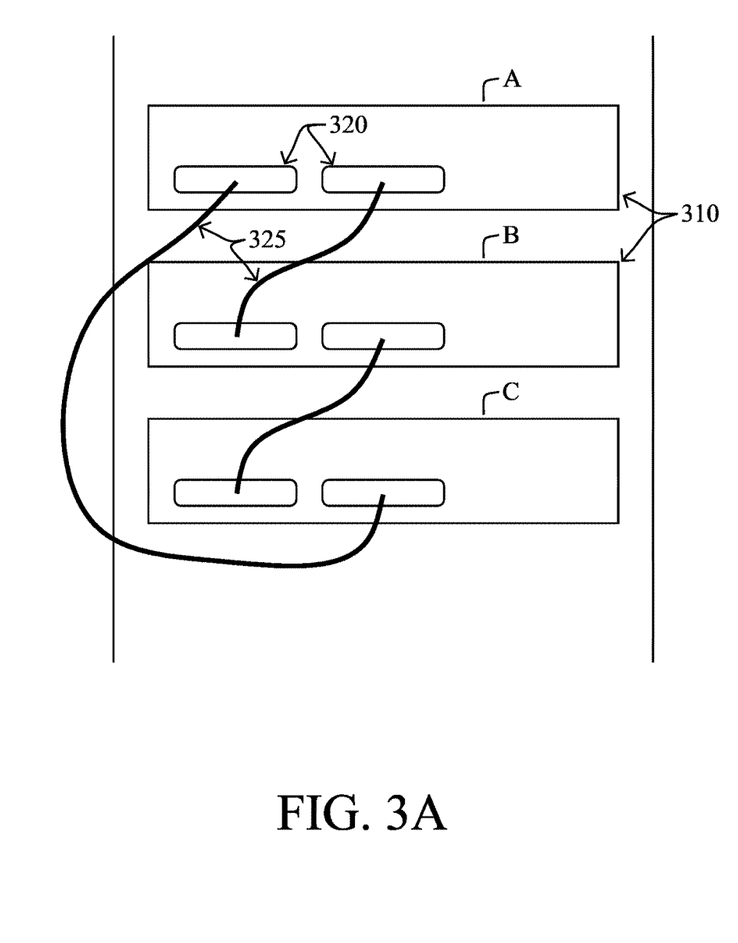
FIGS. 3A-3B illustrate an example of network device stacking.
Figure 3B:
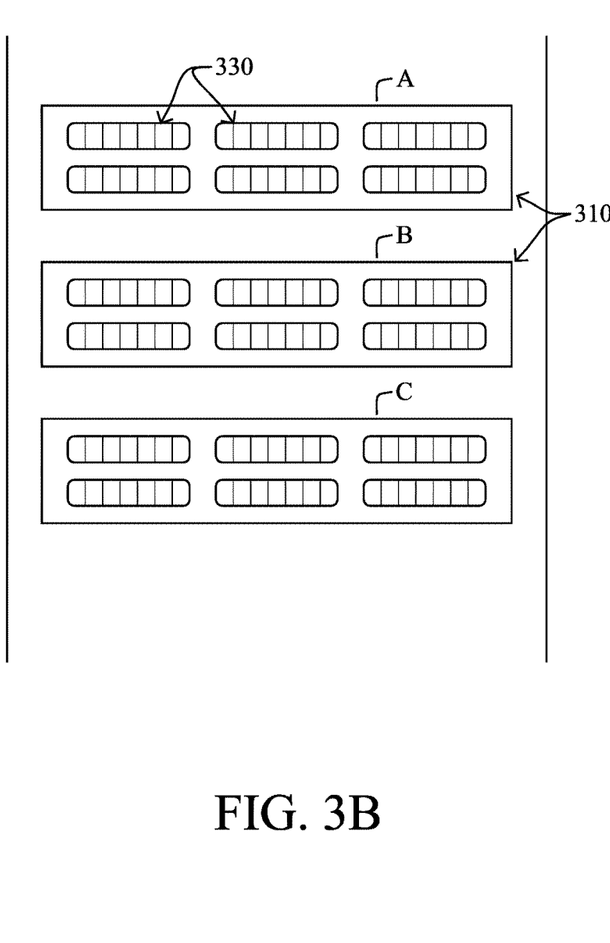

FIGS. 3A-3B illustrate an example stacking arrangement 300, illustratively comprising three stacked devices 310, namely device A, B, and C. As will be understood by those skilled in the art, each of the plurality of devices 310 is a stack member within the stack, and one of the stack members (and thus a particular stack manager process 248) may be designated as a stack master (e.g., by configuration). As shown in FIG. 3A, one side of the devices 310 is shown, typically the "back" of the devices, where one or more of the devices may have dedicated stack ports 320 (with stacking connections/links 325) connected from an egress port of one device to an ingress port of another device, and so on. FIG. 3B, on the other hand, illustrates another side of the devices 310 (e.g., the "front" of the devices), where one or more data ports 330 may be present for connecting the devices to a computer network (e.g., links 105 above).

Figure 4A:
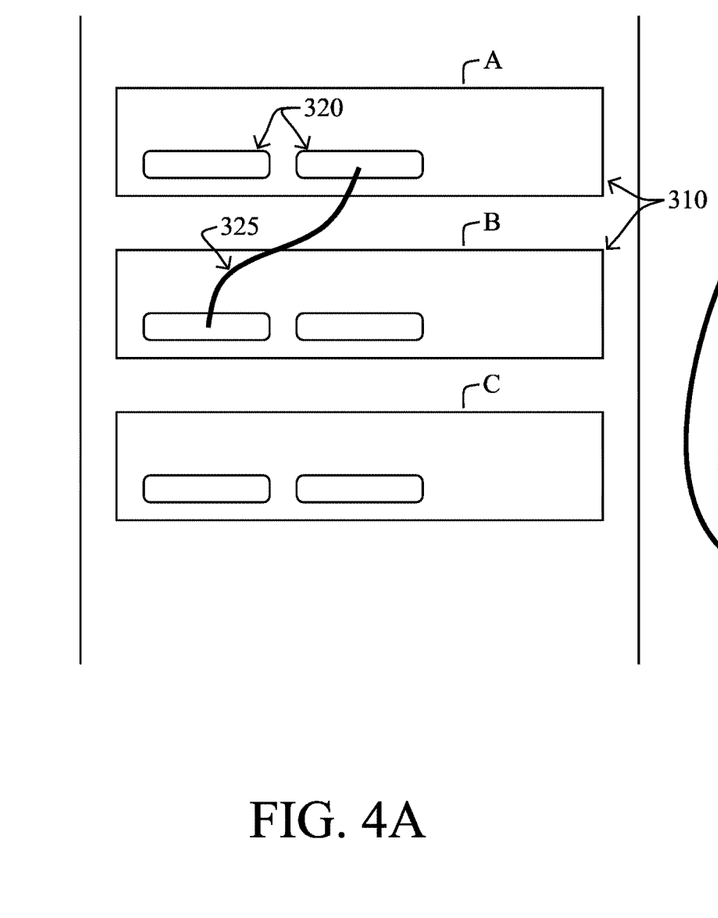
FIGS. 4A-4B illustrate an example of abstract stack port connections to enable platform-independent stacking.
Figure 4B:
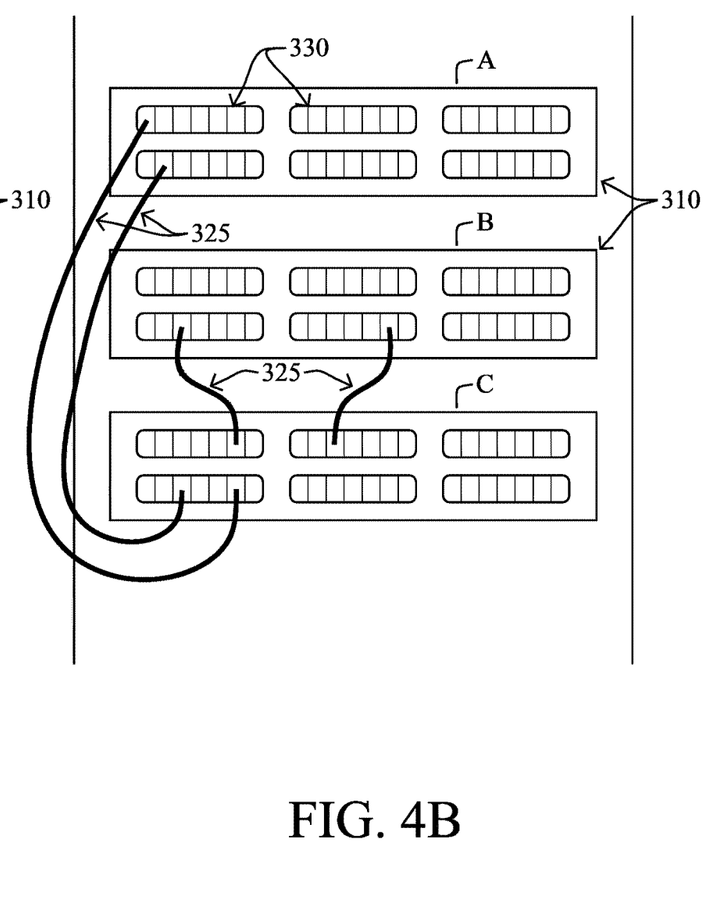

Notably, as described below, though the plurality of stack members may be based on the same type of device platform, the techniques herein are particularly useful for situations where the device platforms may be different, and may actually have different port configurations (e.g., not having dedicated stack ports, or otherwise differently capable.) For example, FIGS. 4A-4B illustrate a different platform environment and physical connection than what was shown in FIGS. 3A-3B. Assume, for instance, that devices 310 A and B are configured with ports as shown in FIGS. 3A-3B, but device C in this example has no dedicated stack ports, and thus only has data ports 330. The stacking connectivity between these devices must therefore be adjusted, and in a manner that allows device C, with no dedicated stack ports, to participate as a stack member.

According to the techniques herein, the platform-independent stacking techniques can map any physical port (or bundle) or dedicated stack port with an abstract stack port recognized by a stack manager. Abstract stack ports, in particular, may be defined (configured) by the stack manager 248 (e.g., based on a CLI-entered administrator command, or else based on process-based configuration).

As a non-limiting example, an abstract stack port (and associated port states) may be encapsulated in a message as follows:

```
enum stack_port {
STACK_PORT_1,
STACK_PORT_2,
}
enum stack_port_state {
STACK_STATE_LINK_DOWN,
STACK_STATE_LINK_UP,
STACK_STATE_NO_CABLE,
};
```

Said differently, a stack manager 248 of an operating system 242 on a network device 200/310 can configure an egress abstract stack port and an ingress abstract stack port, where the configuring maps one or more physical ports of the network device to a corresponding abstract stack port, regardless of whether the ports are dedicated stack ports 320 or conventional data ports 330. Referring again to FIGS. 4A-4B, for example, according to the techniques herein, the use of abstract stack ports allow for certain stacking ports to be dedicated stack ports, while other stacking ports may be comprised of data ports (e.g., "front-side" ports).

Figure 5A:
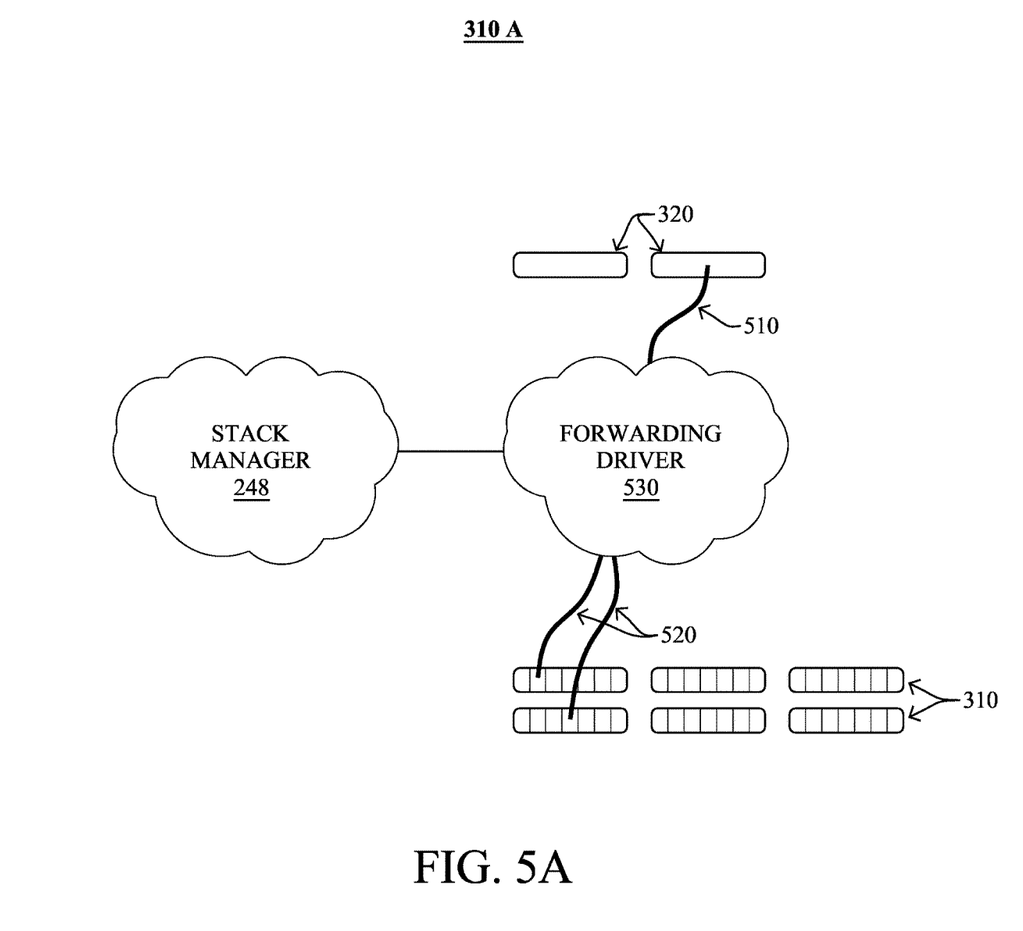
FIGS. 5A-5C illustrate an example of abstract stack ports to enable platform-independent stacking.
Figure 5B:
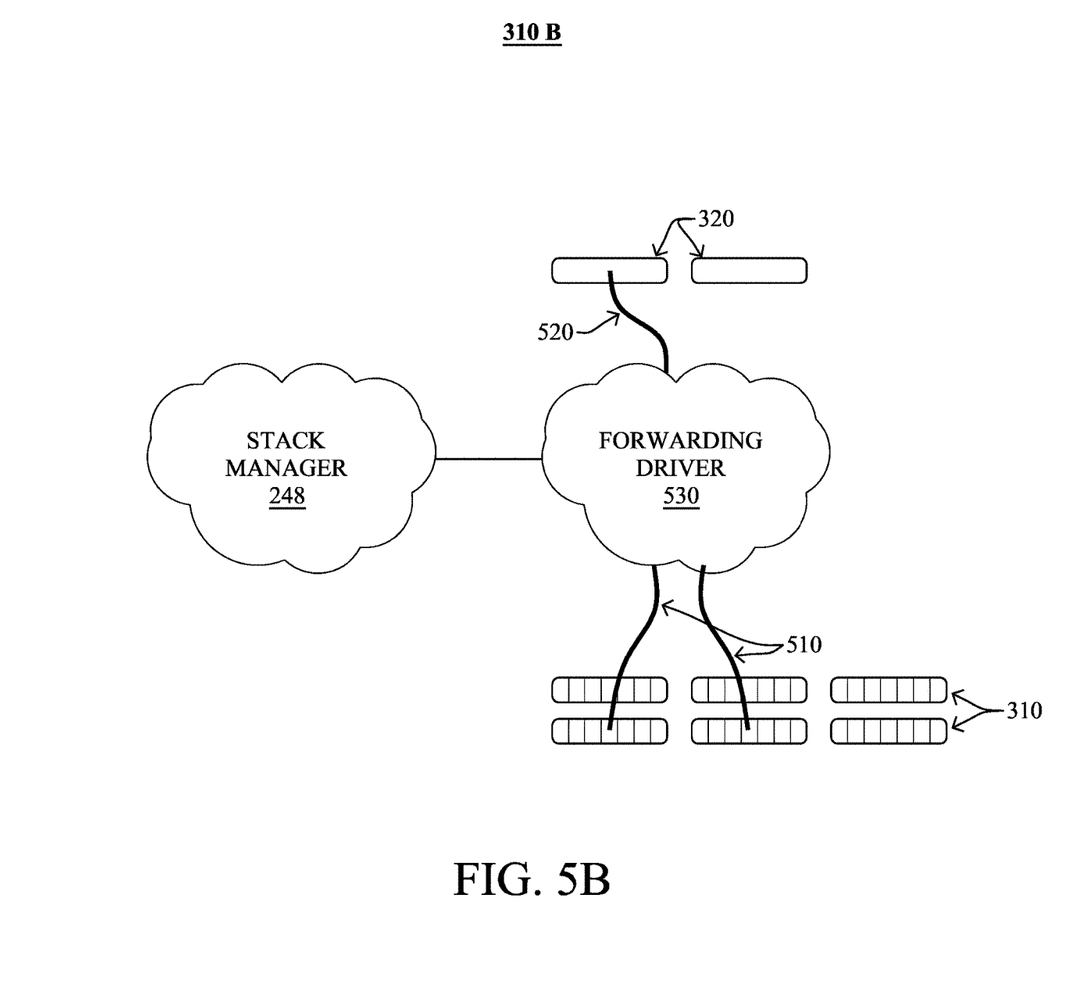
Figure 5C:
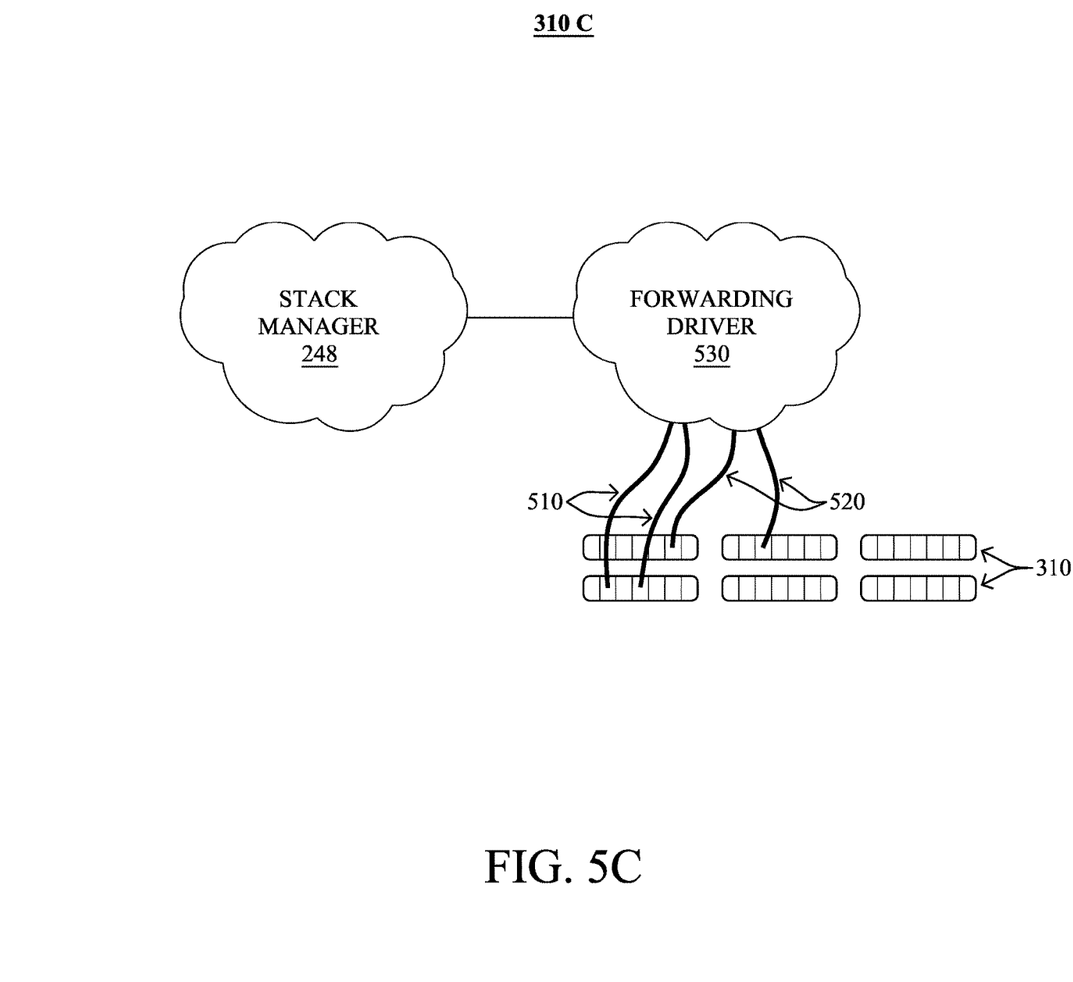

FIGS. 5A-5C, in particular, illustrate an example abstract stack port configuration for each of the example devices 310 A, B, and C, respectively, in accordance with the techniques herein, and based on the connectivity illustrated in FIGS. 4A-4B. For instance, FIG. 5A illustrates device 310 A, where the stack manager 248 defines an egress abstract stack port 510 (to device B) as a dedicated stack port 320, and an ingress abstract stack port 520 (from device C) as a pair of data ports 330. Note that as shown, a forwarding driver 530 provides the backplane data forwarding between physical ports of the device, and as described below, the stack manager 248 may be in communication with the forwarding driver in order to provide stacking configuration and services, accordingly.

As shown in FIG. 5B, device 310 B similarly has an appropriate configuration, where an ingress abstract stack port 520 (from device A) is configured to be a dedicated ingress stack port 320, and then one or more data ports 330 are mapped to the egress abstract stack port 510 (to device C). Lastly, as shown in FIG. 5C, device 310 C, which has no dedicated stack ports 320, may have one or more of its data ports 330 mapped to ingress abstract stack ports 520 (from device B) and egress abstract stack ports 510 (to device A), according to the techniques herein.

Figure 6:
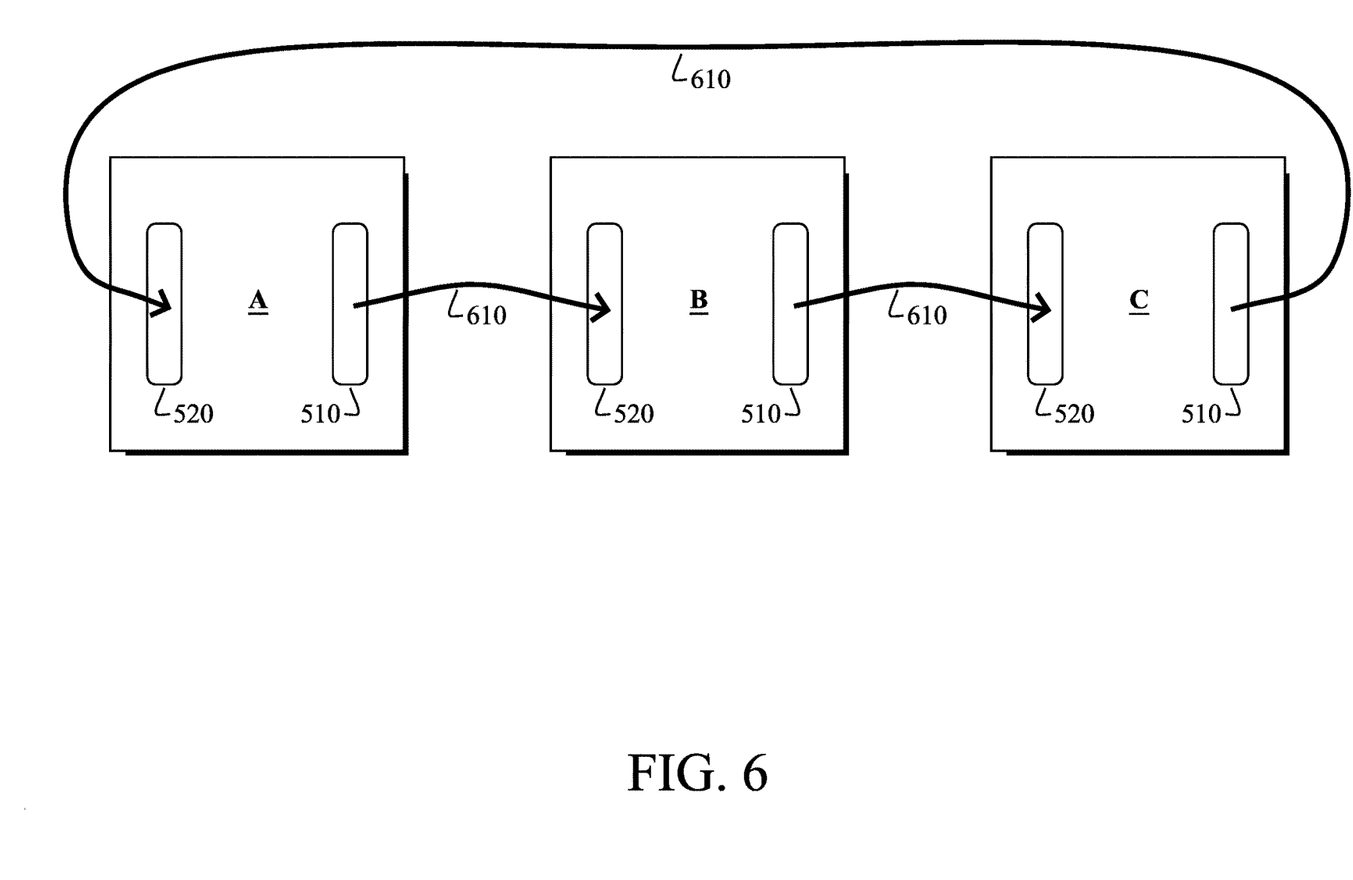
FIG. 6 illustrates an example platform-independent stack discovery messages for platform-independent stacking.

Based on the connectivity and/or configuration, as shown in FIG. 6 the stack manager 248 of each device 310 may participate in a stack discovery exchange (e.g., a stack discovery protocol). In particular, platform-independent stack discovery messages 610 may be transmitted by the stack manager (i.e., an "egress stack discovery message") on its egress abstract port 510 to a "remote" ingress abstract stack port 520 of an adjacent stack member. That is, stack discovery protocol messages may be embodied as platform-independent payload messages sent from the stack manager to the forwarding platform (driver/layer) 530 to "forward" the egress stack discovery messages on a given stack port (i.e., one or more physical ports) to the rest of the "stack members". Thus, the stack manager uses the forwarding driver to forward the message 610 on the physical port(s) mapped to the given (egress) abstract stack port 510.

Similarly, on the receiver side, the stack manager 248 receives the platform-independent (ingress) stack discovery messages 610 on the ingress abstract port 520 from a "remote" egress abstract stack port 510 of an adjacent stack member. Illustratively, the ingress stack discovery messages may be retrieved by the stack manager from the forwarding platform (driver) 530 receive queue for the one or more physical ports of the network device mapped to the ingress abstract stack port (i.e., the platform-independent payload is sent to the stack manager 248 according to the abstract stack port mapping).

Note that in one embodiment, e.g., depending upon the configuration of the abstract stack discovery protocol, an ingress abstract stack port may, in fact, be configured based on receiving platform-independent ingress stack discovery messages 610 on one or more particular physical ports 320/330 of the network device. That is, based on receiving (and detecting) a stack discovery message 610 on one or more ports of a device, the stack manager may determine that such port(s) is/are to be mapped to an ingress abstract stack port. (As an example, assume that the device C receives a stack discovery message on data port "X" and "Y". As such, it can be assumed that ports X and Y are physically connected to an egress abstract stack port of an adjacent device, and as such, should be correspondingly configured as an ingress abstract stack port.)

Once the abstract stack ports are configured, connected, and discovered, the stack manager 248 may proceed with providing platform-independent stacked network device operation using the connectivity between the egress and ingress abstract stack ports on each of the devices, accordingly. For example, as will be appreciated by those skilled in the art, the stack manager 248 may provide one or more computer network services, where the stack of devices 310 act as a localized network domain spanning a plurality of stack members, and where the plurality of stack members are logically a single logical network device. Example computer network services may comprise routing, switching, firewalling, storing, serving, processing, etc.

Notably, as mentioned above, the techniques herein can provide a status of either of the ingress or egress abstract stack ports based on a status of the one or more physical ports of the network device mapped to the corresponding abstract stack port. For instance, as mentioned above, the status of the physical ports may be defined by the stack manager (e.g., default, administrator-defined, etc.), such as link up, link down, no-cable, and so on.

As a non-limiting example, the platform layer may use messages such as:
typedef struct stack_link_status {
stack_port port;
stack_port_state state;
};
to provide status of the given abstract port.

Figure 7:
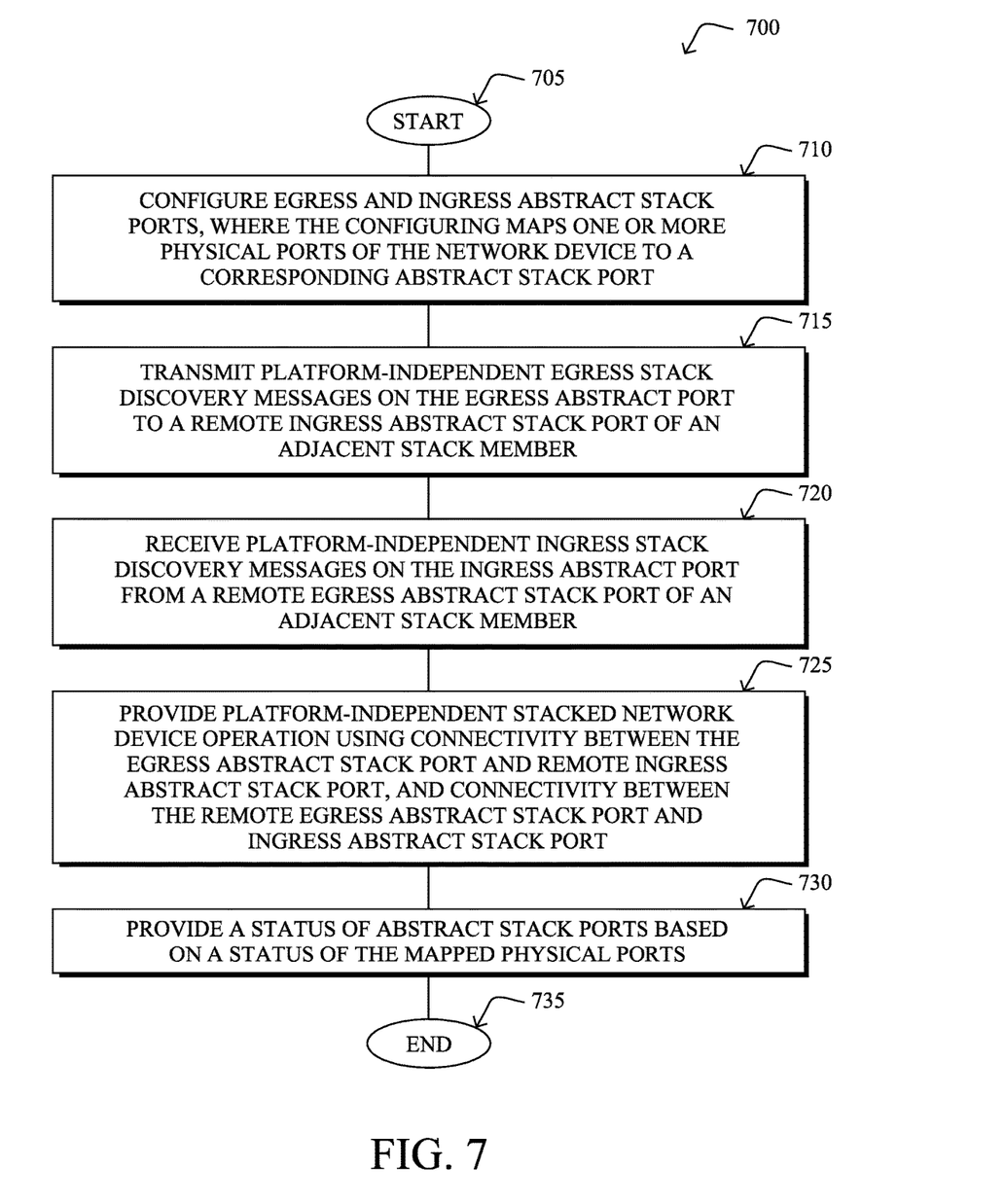
FIG. 7 illustrates an example simplified procedure for providing for abstract stack ports to enable platform-independent stacking.

FIG. 7 illustrates an example simplified procedure for providing for abstract stack ports to enable platform-independent stacking in accordance with one or more embodiments described herein. The procedure 700 may start at step 705, and continues to step 710, where, as described in greater detail above, a stack manager 248 (of an operating system 242 on a network device 200) configures an egress abstract stack port and an ingress abstract stack port, where the configuring maps one or more physical ports of the network device to a corresponding abstract stack port. For instance, as mentioned above, the configuration may be based on receiving administrator commands via CLI, or, particularly for an ingress abstract stack port, based on receiving platform-independent ingress stack discovery messages 610 on particular physical ports of the network device (e.g., and mapping the particular physical ports to the ingress abstract stack port).

In step 715, the stack manager 248 may transmit platform-independent egress stack discovery messages 610 on the egress abstract port to a remote ingress abstract stack port of an adjacent stack member (e.g., sending the egress stack discovery messages to a forwarding platform of the network device, where the forwarding platform forwards the egress stack discovery messages on the physical ports of the network device mapped to the egress abstract stack port). In addition, in step 720, the stack manager may receive platform-independent ingress stack discovery messages 610 on the ingress abstract port from a remote egress abstract stack port of an adjacent stack member (e.g., retrieving the ingress stack discovery messages from a forwarding platform receive queue for the physical ports of the network device mapped to the ingress abstract stack port). Note that steps 715 and 720, as well as step 710 may be performed in any suitable order, depending upon the configuration and placement of the device 200 within the stack (e.g., whether initiating the stack discovery as the stack master, or receiving a stack discovery message first as a subordinate stack member).

Using connectivity between the egress abstract stack port and remote ingress abstract stack port, and connectivity between the remote egress abstract stack port and ingress abstract stack port, the stack manager may then provide platform-independent stacked network device operation in step 725 (e.g., providing one or more computer network services as a localized network domain spanning a plurality of stack members, where the plurality of stack members are logically a single logical network device).

Note that in step 730, the stack manager may also provide a status of either of the ingress or egress abstract stack ports based on a status of the one or more physical ports of the network device mapped to the corresponding abstract stack port (e.g., link up, link down, no-cable, etc., as mentioned above).

The illustrative procedure may then end in step 735, notably with the option of continuing to provide stacked operation, adjust abstract stack port configuration, transmit and receive stack discovery protocol messages (e.g., for changes to stack members), and so on. It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for abstract stack ports to enable platform-independent stacking. In particular, the stacking architecture of the techniques herein eliminates the need for a given routing/switching hardware platform to develop their "own" stacking protocol, enables the platform to optionally use Front Side Ports (data ports) as stack connectors either as Layer 2 or Layer 3, without the need for adding a hardware based stack interface, and adds redundant control plane in one of the "members" of the stack automatically. Moreover, the techniques herein allow any platform to provide their own thin layer to map with the operating system stack manager and introduce stacking to any platform family. Note further that the techniques herein provide stack-based secure inter-processor communication (IPC) with FIPS (Federal Information Processing Standards) compliance.

While there have been shown and described illustrative embodiments, it is to be understood that various other adaptations and modifications may be made within the spirit and scope of the embodiments herein. For example, the embodiments have been shown and described herein using certain terminology and operating system references. However, the embodiments in their broader sense are not as limited, and may, in fact, be used with other types of operating systems, whether for computer networks or computing devices in general. In addition, while certain protocols may have been shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   configuring, by a stack manager of an operating system on a network device, an egress abstract stack port and an ingress abstract stack port, wherein the configuring maps one or more physical ports of the network device to a corresponding abstract stack port;
   transmitting, by the stack manager, platform-independent egress stack discovery messages on the egress abstract port to a remote ingress abstract stack port of an adjacent stack member;
   receiving, by the stack manager, platform-independent ingress stack discovery messages on the ingress abstract port from a remote egress abstract stack port of an adjacent stack member; and
   providing, by the stack manager, platform-independent stacked network device operation using connectivity between the egress abstract stack port and remote ingress abstract stack port, and connectivity between the remote egress abstract stack port and ingress abstract stack port.

2. The method as in claim 1, wherein providing platform-independent stacked network device operation comprises:
   providing one or more computer network services as a localized network domain spanning a plurality of stack members, wherein the plurality of stack members are logically a single logical network device.

3. The method as in claim 1, wherein the stack manager on the network device is a stack master among a plurality of stack members.

4. The method as in claim 1, wherein transmitting comprises:
   sending the egress stack discovery messages to a forwarding platform of the network device, wherein the forwarding platform forwards the egress stack discovery messages on the one or more physical ports of the network device mapped to the egress abstract stack port.

5. The method as in claim 1, wherein receiving comprises:
   retrieving the ingress stack discovery messages from a forwarding platform receive queue for the one or more physical ports of the network device mapped to the ingress abstract stack port.

6. The method as in claim 1, wherein configuring comprising:
   receiving administrator commands via a command line interface (CLI).

7. The method as in claim 1, wherein configuring comprises:
   configuring the ingress abstract stack port based on receiving platform-independent ingress stack discovery messages on one or more particular physical ports of the network device, and mapping the one or more particular physical ports to the ingress abstract stack port.

8. The method as in claim 1, wherein the network device is a stack member among a plurality of stack members, and wherein the plurality of stack members comprise a plurality of different device platforms.

9. The method as in claim 1, wherein the one or more physical ports are selected from data ports and dedicated stack ports.

10. The method as in claim 9, wherein at least one of the physical ports mapped to a corresponding abstract stack port is not a dedicated stack port.

11. The method as in claim 1, further comprising:
    providing a status of either of the ingress or egress abstract stack ports based on a status of the one or more physical ports of the network device mapped to the corresponding abstract stack port.

12. The method as in claim 11, wherein the status of the one or more physical ports is selected from a group consisting of: link up; link down; and no-cable.

13. An apparatus, comprising:
    a plurality of physical ports;
    a processor coupled to the physical ports and adapted to execute one or more processes; and
    a memory configured to store a stack manager process of an operating system executable by the processor, the process when executed operable to:
      configure an egress abstract stack port and an ingress abstract stack port, wherein the configuring maps one or more of the plurality of physical ports to a corresponding abstract stack port;
      transmit platform-independent egress stack discovery messages on the egress abstract port to a remote ingress abstract stack port of an adjacent stack member;
      receive platform-independent ingress stack discovery messages on the ingress abstract port from a remote egress abstract stack port of an adjacent stack member; and
      provide platform-independent stacked network device operation using connectivity between the egress abstract stack port and remote ingress abstract stack port, and connectivity between the remote egress abstract stack port and ingress abstract stack port.

14. The apparatus as in claim 13, wherein the process when executed to provide platform-independent stacked network device operation is further operable to:
    provide one or more computer network services as a localized network domain spanning a plurality of stack members, wherein the plurality of stack members are logically a single logical network device.

15. The apparatus as in claim 13, wherein the process when executed to transmit is further operable to:
send the egress stack discovery messages to a forwarding platform of the apparatus, wherein the forwarding platform forwards the egress stack discovery messages on the one or more physical ports mapped to the egress abstract stack port.

16. The apparatus as in claim 13, wherein the process when executed to receive is further operable to:
retrieve the ingress stack discovery messages from a forwarding platform receive queue for the one or more physical ports mapped to the ingress abstract stack port.

17. The apparatus as in claim 13, wherein the process when executed to configure is further operable to:
receive administrator commands via a command line interface (CLI).

18. The apparatus as in claim 13, wherein the apparatus is a stack member among a plurality of stack members, and wherein the plurality of stack members comprise a plurality of different device platforms.

19. The apparatus as in claim 13, wherein the one or more physical ports are selected from data ports and dedicated stack ports.

20. A tangible, non-transitory, computer-readable media having software encoded thereon, the software, when executed by a processor on a network device, operable to:
configure an egress abstract stack port and an ingress abstract stack port, wherein the configuring maps one or more physical ports of the network device to a corresponding abstract stack port;
transmit platform-independent egress stack discovery messages on the egress abstract port to a remote ingress abstract stack port of an adjacent stack member;
receive platform-independent ingress stack discovery messages on the ingress abstract port from a remote egress abstract stack port of an adjacent stack member; and
provide platform-independent stacked network device operation using connectivity between the egress abstract stack port and remote ingress abstract stack port, and connectivity between the remote egress abstract stack port and ingress abstract stack port.

* * * * *